US008818536B2

(12) United States Patent
Mienhardt et al.

(10) Patent No.: US 8,818,536 B2
(45) Date of Patent: Aug. 26, 2014

(54) METHOD FOR CREATING NUMERICAL CONTROL PROGRAMS

(75) Inventors: Uwe Mienhardt, Korntal-Muenchingen (DE); David Lehmann, Seewis (CH)

(73) Assignee: TRUMPF Maschinen Gruesch AG, Gruesch (CH)

( * ) Notice: Subject to any disclaimer, the term of this patent is extended or adjusted under 35 U.S.C. 154(b) by 283 days.

(21) Appl. No.: 12/888,681

(22) Filed: Sep. 23, 2010

(65) Prior Publication Data

US 2011/0046766 A1 Feb. 24, 2011

Related U.S. Application Data (63) Continuation of application No. PCT/EP2009/001580, filed on Mar. 6, 2009.

(30) Foreign Application Priority Data

Mar. 25, 2008 (EP) ..................................... 08005465

(51) Int. Cl.
*G05B 19/18* (2006.01)
*G06F 9/44* (2006.01)

(52) U.S. Cl.
USPC ........................... 700/87; 717/124; 318/568.1

(58) Field of Classification Search
USPC ......... 700/83, 86, 87, 97, 103, 104, 159, 160, 700/166, 170, 264; 717/100, 106, 110, 124; 318/567, 568.1, 568.22–568.25, 569, 318/570
See application file for complete search history.

(56) References Cited

U.S. PATENT DOCUMENTS

| | | | |
|---|---|---|---|
| 4,446,525 A | | 5/1984 | Hoch et al. |
| 4,912,625 A | * | 3/1990 | Glatfelter ........................ 700/87 |
| 5,043,906 A | * | 8/1991 | Jepson .......................... 700/192 |
| 5,144,550 A | * | 9/1992 | Sasaki et al. .................... 700/87 |

(Continued)

FOREIGN PATENT DOCUMENTS

| | | |
|---|---|---|
| EP | 0207998 A1 | 1/1987 |
| EP | 0592682 A1 | 4/1994 |

(Continued)

OTHER PUBLICATIONS

Notification of Transmittal of Translation of the International Preliminary Report on Patentability for corresponding PCT Application No. PCT/EP2009/001580, issued Oct. 5, 2010, 11 pages.

(Continued)

*Primary Examiner* — M. N. Von Buhr
(74) *Attorney, Agent, or Firm* — Fish & Richardson P.C.

(57) ABSTRACT

A method for creating an NC program for controlling a test run for determining, optimizing and/or validating processing parameters and/or control parameters of a processing operation on a laser processing machine comprises accessing a base NC program that includes at least one contour variable for the at least one test contour to be produced in the test run and at least one decision function for value assignment of a contour parameter to the contour variable, providing a selection function for selection by an operator of a combination of input values that are characteristic of the processing operation, and creating the NC program from the base NC program by automatic execution of the at least one decision function for assigning a contour parameter to the contour variable, the contour parameter being determined based on the combination of input values.

20 Claims, 3 Drawing Sheets

(56) References Cited

U.S. PATENT DOCUMENTS

| | | | |
|---|---|---|---|
| 5,285,378 A * | 2/1994 | Matsumoto | 700/37 |
| 5,400,260 A * | 3/1995 | Matsumura et al. | 700/180 |
| 5,544,046 A | 8/1996 | Niwa | |
| 5,575,935 A | 11/1996 | Nakata | |
| 6,007,319 A * | 12/1999 | Jacobson | 425/140 |
| 6,047,225 A * | 4/2000 | Iriguchi et al. | 700/187 |
| 6,198,246 B1 * | 3/2001 | Yutkowitz | 318/561 |
| 6,317,646 B1 * | 11/2001 | de Caussin et al. | 700/173 |
| 6,349,237 B1 * | 2/2002 | Koren et al. | 700/96 |
| 6,400,998 B1 * | 6/2002 | Yamazaki et al. | 700/86 |
| 6,643,561 B1 * | 11/2003 | Torvinen | 700/166 |
| 6,850,806 B2 * | 2/2005 | Yutkowitz | 700/54 |
| 6,859,747 B2 * | 2/2005 | Yutkowitz | 702/105 |
| 6,861,814 B2 * | 3/2005 | Hayashi | 318/561 |
| 6,920,408 B2 * | 7/2005 | Yutkowitz | 702/105 |
| 6,961,628 B2 * | 11/2005 | Yutkowitz | 700/37 |
| 7,464,574 B2 * | 12/2008 | Durney et al. | 72/324 |
| 7,577,492 B2 * | 8/2009 | Kamiya et al. | 700/182 |
| 7,761,183 B2 * | 7/2010 | Sullivan | 700/182 |
| 8,084,713 B2 * | 12/2011 | Idaka et al. | 219/121.83 |
| 8,095,231 B2 * | 1/2012 | Tasker et al. | 700/121 |
| 8,114,524 B2 * | 2/2012 | Durney | 428/597 |
| 8,121,717 B2 * | 2/2012 | Idaka et al. | 700/98 |
| 2008/0078751 A1 * | 4/2008 | Abrott | 219/121.69 |

FOREIGN PATENT DOCUMENTS

| | | |
|---|---|---|
| JP | 3230878 A1 | 10/1991 |
| JP | 4070908 A1 | 3/1992 |
| JP | 4080802 A1 | 3/1992 |
| JP | 4081285 A1 | 3/1993 |
| JP | 7001286 A1 | 1/1995 |
| JP | 2002239760 A1 | 8/2002 |
| WO | 0150404 A1 | 7/2001 |

OTHER PUBLICATIONS

International Search Report from corresponding PCT Application No. PCT/EP20009/001580, mailed Jun. 25, 2009, 6 pages.

* cited by examiner

METHOD FOR CREATING NUMERICAL CONTROL PROGRAMS

CROSS-REFERENCE TO RELATED APPLICATIONS

This application is a continuation of and claims priority under 35 U.S.C. §120 to PCT/EP2009/001580, filed on Mar. 6, 2009, and designating the U.S., which claims priority under 35 U.S.C. §119 to European Patent Application No. 08 005 0465.3-1239, filed on Mar. 25, 2008. The contents of the prior applications are hereby incorporated by reference in their entireties.

TECHNICAL FIELD

The invention relates to a method for creating a numerical control (NC) program for controlling a test run for determining, optimizing and/or validating processing parameters and/or control parameters of a processing operation on a laser processing machine, and to a computer program product for carrying out the method.

BACKGROUND

Tests for determining processing parameters and/or control parameters are required on laser processing machines in the manufacturer's development, training and demonstration departments, in after-sales service or also by the customer, since those parameters may vary greatly depending on the chosen processing task.

For example, a wide variety of materials may be processed with a laser processing machine, such as structural steel (uncoated, electroplated or hot-dip galvanised), stainless steel or aluminum. Depending on the material and the thickness of the workpiece to be processed, in the case of laser cutting, for example, different cutting methods are employed (oxygen cutting, nitrogen high-pressure cutting, nitrogen, oxygen or compressed air high-speed cutting, compressed air cutting or plasma-assisted cutting). Depending on the material, workpiece thickness and cutting method, a wide variety of technological constraints have to be taken into consideration, for example piercing and approach methods, geometric limit values during approach and, in the case of contour sizes, minimum rounding radii or spacing from neighboring parts. Furthermore, laser cutting machines may be equipped with lasers of differing output power.

Reliable and high-quality processing results can be achieved only if careful consideration is given to the constraints which vary according to type of material, thickness of material and cutting method. To control the processing of materials with a laser cutting machine, while taking into consideration the constraints that are to be observed, it is therefore necessary for various parameter data sets to be known or to be determined for every type of laser. Such a data set typically consists of processing parameters and control parameters. The processing parameters include, for example, focus position, laser output power, gas pressure and speed of movement, and comprise (numerical) values for reliable piercing, cutting of different contour sizes, labeling, point marking, ablating and welding. The control parameters define, in dependence on the processing that is to be performed, what is to be done under what conditions, that is to say, what processing parameters are to be called up in the control program and what geometric constraints (e.g. approach lengths in dependence on workpiece thickness, necessary rounding radii at corners of the contour, minimum permissible contours, . . . ) are to be observed.

In determining or verifying such data sets for controlling the laser processing of materials, the following tasks arise: determining and optimizing suitable processing parameters (e.g. focus position, cutting gas pressure, laser output power, pulse frequency, . . . ) for various types of processing such as piercing, cutting, labeling, point marking, ablating, welding taking the control parameters into consideration, determining control parameters, validating the processing parameters and control parameters for the various types of processing in continuous machine operation, and producing near-production test pieces using the processing parameters for the various types of processing. That procedure must ensure before production, i.e. even before the processing operation, that the interaction of the available processing parameters, the material to be processed and the state of the machine makes reliable processing possible.

The tasks mentioned are usually carried out by machine operators who, on the basis of their experience, create suitable test programs which are then executed by the laser processing machine. For each task and for each material to be processed, a suitable control program is programmed for the purpose. That procedure is very time-consuming, and a standardized procedure on the part of different operators can be ensured only with a great deal of documentation and information-gathering work.

JP 04070908 A provides an automatic programming device for a laser processing machine, in which a knowledge database is provided in which expert knowledge on laser processing is stored. With the aid of the expert knowledge a decision function determines the optimum processing parameters, which are passed to a function to create an NC program. The knowledge database can be filled with expert knowledge by an operator by way of a dialogue function.

A method and an apparatus are known from JP 2002239760 A, in which optimum processing parameters are determined by experimentally specifying processing parameters with the exception of a processing speed. With constant processing parameters, the processing speed is then varied in order to determine the range of values of the processing speeds that are possible with those processing parameters. That procedure is repeated, with the processing parameters being changed, until the optimum processing parameters are found, at which the range of values of the processing speeds available for the processing operation is at a maximum.

A programming method is known from JP 07001286 A, in which an operator is provided with a selection function for selecting a combination of input values that are characteristic of a processing operation. On the basis of those input values, for example the type of processing, an automatic decision is made as to the optimum processing parameters of the processing operation with the aid of parameter data sets.

JP 03230878 A provides a method and an apparatus for automatically specifying output conditions of a laser beam, for example its output power and pulse frequency, and for specifying the gas pressure of a stream of gas assisting the laser processing. For that purpose, parameter values such as type of material and thickness of material are read out from an NC processing program and an associated parameter data set is determined. The output conditions and the gas pressure for the laser processing operation are then determined from the parameter data set in dependence on a processing speed which is likewise read out from the NC processing program.

SUMMARY

The present invention provides a method for adapting an NC program for controlling test runs to the technological conditions of the processing operation. The NC program can be created automatically from a base program on the basis of a small number of input values that are characteristic of the processing operation.

In some aspects, methods of the present invention include accessing a base NC program that includes at least one contour variable for the at least one test contour to be produced in the test run and at least one decision function for value assignment of a contour parameter to the contour variable, providing a selection function for selection by an operator of a combination of input values that are characteristic of the processing operation, and creating the NC program from the base NC program by automatic execution of the at least one decision function for assigning a contour parameter to the contour variable, the contour parameter being determined based on the combination of input values.

Once the machine operator has selected a combination of input values in a dialogue-based selection, in the machine control of the laser processing machine the values that are to be given to the contour variable(s) in order to produce technologically suitable cutting contours for the test run are automatically specified according to the selected input values by execution of the decision function(s). The contour variable used may, for example, be the type of test contour (e.g. meanders, single squares for thick material, slot-meanders for rapid cutting etc.), which is assigned suitable values by the decision function in dependence on input values such as type of material, thickness of material, type of gas and/or cutting method. The suitable values may be directly included in the base NC program or the decision function may for that purpose be linked to contour parameter data tables from which it takes those values.

In some examples, the base NC program includes at least one control parameter variable and/or processing parameter variable whose value assignment with technically suitable values is carried out in dependence on the selected combination of input values. The technologically suitable values for the processing and control parameters are stored in data tables, with one data table for the processing parameters and one data table for the control parameters being stored in the machine control for each possible combination of input values. For the assignment to the parameters, the base NC program may be linked to the correct data table directly in dependence on the selection of input values, and the values can be read into the base NC program from the data table.

In some examples, the base NC program includes at least one further decision function which is automatically executed in creating the NC program to assign values to the control parameter variables and/or to the processing parameter variables. In that case, the assignment of values to the control parameter and processing parameter variables is carried out in a manner analogous to the assignment of values to the contour variables, using decision functions in the base NC program.

In some examples, the assignment of values to the contour variables, to the processing parameter variables and/or to the control parameter variables is carried out by linking the base NC program to parameter data tables, especially by way of the decision functions, and by reading-out of the values from the parameter data tables. The data tables are preferably stored in one or more databases which serve as knowledge memories of the control and which may also be used, independently of the NC program for the test run for determining/validating data, by other control programs for parts that are actually to be produced.

In some examples, the input values are selected from the group including: type of material, thickness of material, type of processing gas, focal length of the focusing lens system in the processing head of the laser processing machine, nozzle diameter of the processing nozzle on the processing head, and type of processing (piercing, nitrogen cutting, oxygen cutting, nitrogen high-pressure cutting, nitrogen, oxygen or compressed air high-speed cutting, compressed air cutting, plasma-assisted cutting, labeling, point marking, ablating, welding, etc.). The input values thus define what material is to be processed in what way.

The contour variables are selected from the group including: type of contour, size of contour, contour spacing, contour rounding radius, length of approach path and direction of approach. In dependence on the selected input values, assignment of technologically suitable values to the contour variables is carried out automatically by the decision functions in the base NC program. The following parameters, therefore, are specified: type of contour (e.g. meander, closed square or also merely a piercing hole), size of the contour(s), spacing or density of individual contours or contour portions, necessary rounding radius of corners in the contour, length of approach path from piercing point to contour, and the direction of approach.

The processing parameter variables are selected from the group including: laser output power, focus position, processing speed, pulse frequency, processing gas pressure, laser beam diameter and nozzle spacing from the workpiece to be processed.

The control parameters vary in dependence on the type of processing selected and include, for example, minimum surface areas of cuttable contours in dependence on thickness of the material, minimum rounding radii at corners of contours in dependence on thickness of the material, specifications as to variation of the laser output power when piercing, approaching or cutting etc.

In some preferred examples, at least one control command to warm up or cool down a beam-guiding optical system of the laser processing machine before production of a test contour is provided in the NC control program. Especially at high laser output powers of, for example, more than 3 KW, the thermal state of the optical elements of the laser processing machine should be taken into account when processing the material. In this case, it is advantageous for the determination and validation of parameters to be carried out both in the cold state and in the warm state of the optical elements, for which purpose the NC program is expanded by a program component in which warming and/or cooling times of the laser processing machine are specified. If applications are to be carried out in the warm state of the optical elements, then before actual test contour processing a pre-warming movement is executed beside the workpiece (sheet metal), in which the laser beam is fired with the laser output power that will be required in the contour processing that is to be carried out after the pre-warming. If applications are to be carried out in the cold state, typically a waiting period, in which the laser beam is not fired, is observed beforehand.

It is preferred that the assignment of values to at least one of the processing parameter variables and/or control parameter variables be carried out with a range of values which are varied during the test run, with the contour variables preferably being assigned a fixed value. For the determination and optimization of processing and/or control parameters, in this case at least one of those variables is not assigned a fixed value but is assigned a range of possible values. As a result, on execution of the NC program a variation of that parameter takes place, that is to say, in the case of constant contour variables the same test contours may be cut, labelled or ablated under the same conditions with a variable parameter, which is advantageous for determining optimum parameters.

To specify the range, start and stop values and suitable increments, for example, may be used.

In one preferred example, the assignment of values to at least one of the contour variables is carried out with a plurality of values distributed over a range which are varied during the test run, with the processing parameter variables and/or the control parameter variables preferably being assigned a fixed value. In that case, validation of processing parameters and/or control parameters that have already been determined and optimized is performed by cutting, on execution of the NC program, different-shaped contours or also contours of the same shape but differing sizes and hence differing surface areas, or also identical contours with differing rounding radius at the corners, etc. In that manner it becomes possible, for example in a continuous-operation validation run with fixed assignment to the control and processing parameters, to cut a number of contours of differing shape and size, while ensuring optimum assignment to the workpiece (typically a sheet metal panel) of contours by the automatic specification of the contour spacing by the decision functions. In addition, it is possible to determine minimum cuttable surface areas and rounding radii as control parameters.

Preferably, an editing function is provided for one or more of the following activities of the operator: editing of the value assignment to the contour variables, to the processing parameter variables and/or to the control parameter variables; editing the selection of those contour variables, processing parameter variables and/or control parameter variables the value assignment to which is carried out with a plurality of values distributed over a range; and editing of the parameter data tables by the operator. In this manner, it is possible for the machine operator to define the test job and manually influence the contour, control or processing parameters which have been assigned values in the NC program. Furthermore, the machine operator is able to store the optimum parameters determined in the manner described above in the parameter data tables for the control and/or processing parameters.

It is preferred that the selection function and the editing function be implemented in the same dialogue function on a user interface. The user interface may be provided on a control panel of the laser processing machine and enables the machine operator both to monitor the test run and to store the parameter values determined in the test run in the relevant data tables.

A further aspect of the invention is implemented in a computer program product having code means adapted to carry out all steps of the method described above for creating an NC program when the program is run on a data-processing system. The computer program product may preferably be in the form of software providing the functions described above. As the data-processing system for running the software, a control unit of the laser processing machine which also provides the user interface may be used.

Further advantages of the invention will be apparent from the specific description and the drawings. Equally, the features mentioned above and the features set forth hereinafter may be used individually or a plurality thereof may be used in any desired combination. The embodiments shown and described are not to be understood as forming a definitive list, but rather are of the nature of examples for illustrating the invention.

DETAILED DESCRIPTION

Figure 1:
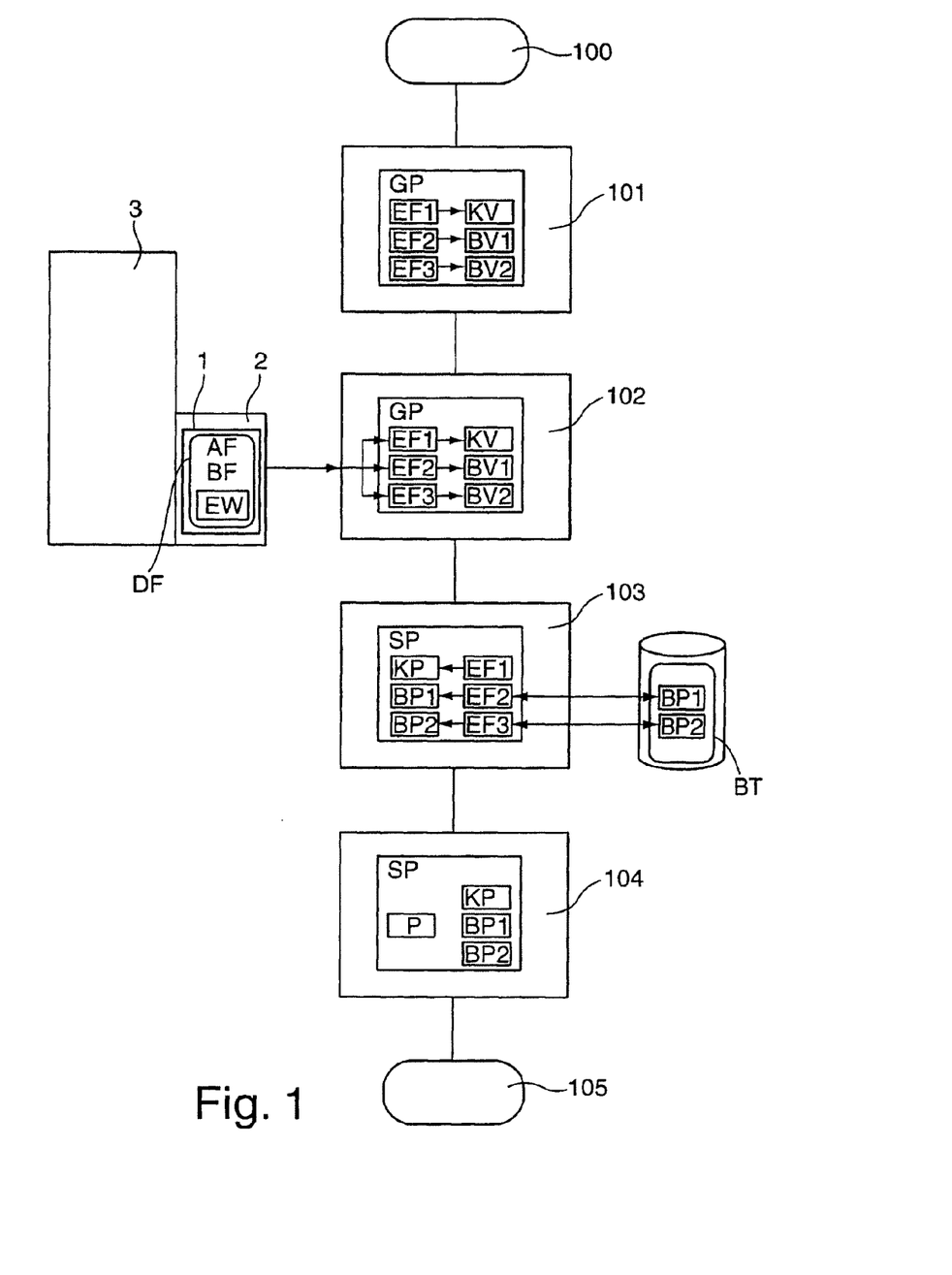
FIG. 1 shows a flow diagram of one variant of the method according to the invention for creating an NC program for controlling a test run of a laser processing machine.

FIG. 1 shows a flow diagram of one variant of a method for automatically creating an NC program for controlling a test run for determining and/or for optimizing the focus position and the processing speed of a processing operation on a laser processing machine.

After the start of the method in a first step 100, in a second step 101, a base NC program GP is provided which contains a contour variable KV for test contours that are to be produced in the test run. In the example under consideration, the contour variable KV used is the type of contour, i.e. the type of test contour to be produced, which includes a predetermined number of contour shapes, e.g. meanders, squares, triangles, rectangles, slot meanders etc. A decision function EF1 is associated with the contour variable KV and serves to assign values thereto, i.e. to select a contour shape from a predetermined number of contour shapes, as described in detail hereinafter.

The base NC program GP further includes a first processing parameter variable BV1 "focus position" and a second processing parameter variable BV2 "processing speed." A second and a third decision function EF2, EF3 are associated with the two processing parameter variables BV1, BV2 and likewise serve to assign values thereto.

Both the assignment of values to the contour variables KV and the assignment of values to the processing parameter variables BV1, BV2 are carried out in dependence on a combination of input values EW that are characteristic of the processing operation, which combination is selected in a subsequent step 102 by an operator at a user interface 1 of an operating panel 2 of a laser processing machine 3 which provides for that purpose a dialogue function DF with a selection function AF. The input values EW include inter alia the type of material to be processed, the thickness of the material, the type of processing gas, the focal length of the focusing lens system, the nozzle diameter and the type of processing, for example piercing, cutting, labeling, point marking, ablating, welding etc. In the case under consideration, the operator selects a thin material of approximately 1 to 12 mm on which a cutting operation is to be performed as the processing operation. In addition, the operator specifies in the dialogue function DF, using an editing function BF, that the processing parameter variables BV1 and BV2 are to be varied over a range of values.

Figure 2A:
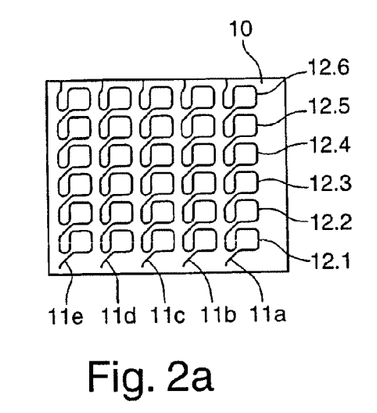
FIGS. 2a-c are schematic illustrations of meanders (FIG. 2a), squares (FIG. 2b) and slots (FIG. 2c) produced by laser cutting in a test run as test contours for determining optimum processing parameters.

On the basis of the combination of input values EW, in a subsequent step 103 for automatic creation of an NC program SP, the decision function EF1 assigns the contour variable KV in the base NC program GP with a technologically suitable test contour as the contour parameter KP, which in the example under consideration is for a low-thickness workpiece 10 which is shown in FIG. 2a a meander structure 11a-e.

In the same manner, further contour variables (not shown in FIG. 1), such as test contour size (the thicker the material or the higher the cutting speed, the larger is the contour), the test contour density (the thicker the material, the greater is the spacing of adjacent contour portions), the contour spacing, the contour rounding radius, the length of the approach path, and the direction of approach, are also assigned suitable contour parameters.

The assignment of values to the processing parameter variables BV1, BV2 is carried out by means of technologically suitable processing parameters BP1, BP2 being read-out by the relevant decision functions EF2, EF3 from a processing parameter table BT with which they are linked. In this case, that is to say, for parameter optimization, for assigning values to the processing parameter variables BV1, BV2 a standard value and a value range that is to be tested are read out from the processing parameter table BT, which the operator can accept or change by way of the editing function BF. The processing parameter variables BV1, BV2 are in that manner assigned a range of values for the processing parameters BP1, BP2, which are varied during the test run. In this case also, during the test run, at each point in time the processing parameter variables BV1, BV2 are assigned exactly one processing parameter BP1, BP2, the assignment of values being varied portion-by-portion during the test run.

A test run in which the first processing parameter BP1 for the focus position is assigned a range of values is advantageous since, during material processing, the focus position must be capable of being varied, where applicable, about the standard focus position within certain limits without the reliability of the process or the processing quality being allowed to fall off to a noticeable extent. FIG. 2a shows how, in the case of the workpiece 10, such a recording of the focus position range is made by cutting at each of the meanders 11a-e six identical test contour portions 12.1 to 12.6 each with a different focus position, the variation of the focus position between the test contour portions 12.1 to 12.6 taking place automatically while the remaining processing parameters and contour parameters remain constant.

Such a variation of the value may also be carried out for other cutting parameters, such as laser output power, sampling frequency, nozzle spacing, cutting speed, gas pressure and laser beam diameter. In FIG. 2a, for example, in the test run the processing speed is varied as a second processing parameter BP2 between each of the individual meanders 11a-e, by increasing the processing speed starting at 1 m/min for the first meander 11a by 0.2 m/min each time. By varying two processing parameters BP1, BP2 during the test run along two different processing directions X, Y it is accordingly possible for two processing parameters BP1, BP2 to be simultaneously varied over a range on the same workpiece 10.

Since, in the case of lasers with rated output powers above approximately 3 KW, the thermal state of the optical elements of the laser processing machine must be taken into consideration in the processing of the material, variation of the parameters should be carried out both in the cold state and in the warm state of the optical elements. If a laser with a corresponding output power is chosen by the operator as the input value EW, in a subsequent step 104, a program component P may be additionally provided in the NC program SP, in which program component P warming and/or cooling times of the laser processing machine 3 are specified. For example, in the workpiece 10 of FIG. 2a, two meanders 11a-e produced in succession as test contours may be cut at identical processing speeds, but the first meander 11a, 11c, 11e may be cut in the warm state and the second meander 11b, 11d in the cold state of the internal and external optical systems.

For that purpose, before a meander 11a, 11c, 11e cut in the warm state is produced, a "pre-warming movement" is executed beside the workpiece 10 before actual contour processing, in which movement the laser beam is fired with the laser output power that will be required in the contour processing that is to be carried out after pre-warming. The duration (e.g., 30 seconds), length (e.g., a reciprocating movement of 100 mm) and axial direction of the pre-warming movement may be altered by the operator. To produce the meanders 11b, 11d cut in the cold state, typically a waiting period (e.g., 20 seconds), in which the laser beam is not fired, is observed beforehand. The duration of that waiting period may be altered just like the pre-warming time.

Once configuration of the NC program has been completed in a step 105, a test run is typically carried out by executing the NC program SP on the laser processing machine 3. After the end of the test run, the operator is able to tell from the cut workpiece 10 the parameter values at which an optimum cutting result has been achieved and the limits within which results that are still acceptable are achieved. The operator is subsequently able to input the optimum parameters or, where applicable, suitable ranges and store them in the processing parameter table BT by way of the editing function BF provided by the dialogue function DF.

Figure 2B:
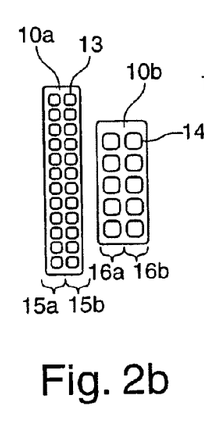

In the case of thicker workpieces 10a, 10b, such as those shown in FIG. 2b, instead of the meanders 11a-e shown in FIG. 2a individual squares 13, 14 may be cut out as test contours, it being possible in this case also for the focus position to be varied between the squares 13, 14 of each of the two adjacent rows 15a, 15b and 16a, 16b. The first of the two rows 15a, 16a of squares 13, 14 may each be cut in the warm state of the optical elements whereas the second rows 15b, 16b are cut in the cold state.

Figure 2C:
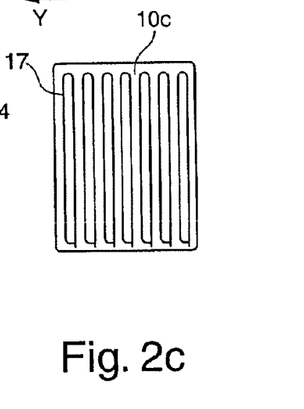

Especially when the processing operation involves high-speed cutting or when a processing speed greater than a threshold speed (e.g., 15 m/min) is selected, slot holes 17 as shown in FIG. 2c are especially suitable as test structures and economical in terms of material. In the case of high-speed cutting, the test structures have to be sufficiently long to enable high processing speeds to be reached over a distance of a few centimeters. It will be appreciated that the slot holes 17 may also be produced in an orientation rotated through 90°, i.e., along the Y-axis, in order for the cutting properties of the laser processing machine 3 to be tested in that direction also.

Figure 3A:
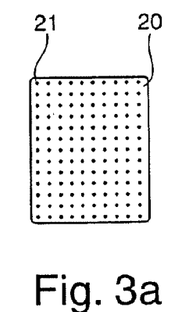
FIGS. 3a-d are schematic illustrations of test contours on piercing, approaching and cutting of circles during a test run, FIGS. 4a,b are schematic illustrations of test contours for determining control parameters.
Figure 3B:
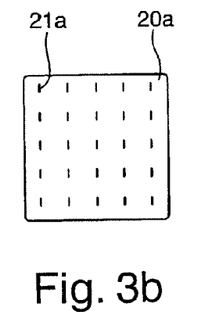
Figure 3C:
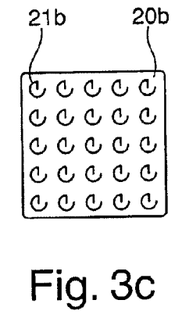
Figure 3D:
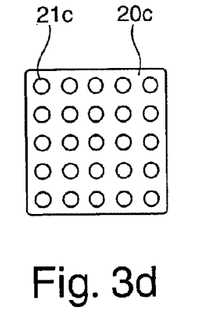

Also in the case of labeling, point marking, ablating or welding and in the case of piercing, it is possible to verify individual data sets or record ranges for parameters such as focus position, nozzle spacing, gas pressure, etc., as is explained below with reference to FIGS. 3a-d for piercing. FIG. 3a shows in that connection a workpiece 20 with a range recording of two processing parameters, for example focus position and nozzle spacing, which are varied in the X-direction and the Y-direction, respectively, with merely piercing holes 21 being made as a first option. FIG. 3b shows a corresponding workpiece 20a in which both piercing is carried out and an approach path 21a is travelled in the X-direction; the remainder of a circular contour which is to be cut out of the workpiece 20a is in this case travelled without laser output but with cutting gas available. After approaching, as shown in FIG. 3c a ¾ circle 21b may be cut in a workpiece 20b or, as shown in FIG. 3d by means of a further workpiece 20c, a full circle 21c may be cut.

The particular option, for example piercing alone, piercing with approaching, piercing with approaching and additional contour cutting, depends on the assignment to the contour variables KV of a contour parameter KP which in turn is dependent on the input values EW. In the example illustrated above, the contour to be cut is in each case a circle the size of which is automatically specified in dependence on the type and thickness of the material, the type of gas and the type of cutting. The division of piercing and cutting into different operating sequence components, as illustrated above, makes it possible to correlate any problems that occur—e.g. contamination of the cutting lens or the processing nozzle—with the individual processing phases and can therefore be used for troubleshooting, since the causes of the contamination can be determined systematically in that case.

Figure 4A:
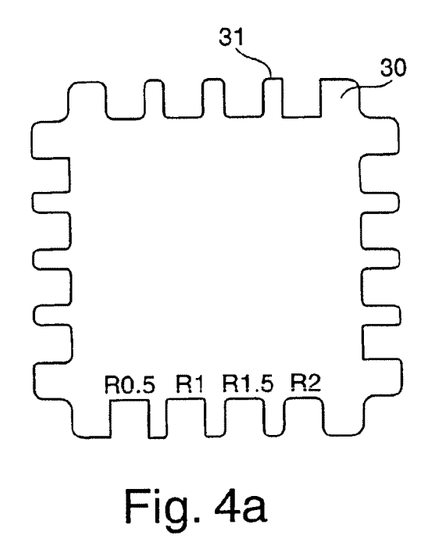

Analogously to the determination and/or optimization of processing parameters illustrated above in connection with FIGS. 1 to 3, it is also possible as an alternative or in addition to determine control parameters for the processing operation, for example minimum permissible rounding radii. For that purpose, as shown in FIG. 4a, changes in direction along a test contour 31, which is dependent on the selected input values EW, on a workpiece 30 can be rounded with different rounding radii R0.5, R1, R1.5, R2. Depending on the processing result, minimum permissible rounding radii may be specified as control parameters in that manner.

Figure 4B:
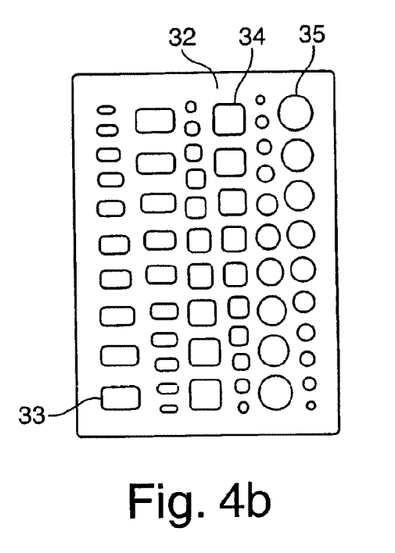

FIG. 4b shows, as a further example of the determination of control parameters, the determination of contour limit values on a workpiece 32, in which the contour variable "type of contour" has been defined as a rectangle 33, square 34 or circle 35 and the variable "contour size" has been assigned a range of different values. Depending on the processing result, it is possible in that manner for minimum processable surface areas to be specified as control parameters for the selected type of material and thickness of the workpiece 32 and for the selected cutting method.

To determine an optimum control parameter for producing so-called "microjoints" when laser-cutting (not shown), the corresponding control parameter variable can likewise be assigned a range of values. A "microjoint" is produced in the production process at the end of a contour or also in the middle of a contour by not cutting a length of a few tenths of a millimeter. By that means, the contour is not cut completely free at the end of the processing operation, and therefore the cut-free part does not tip over between supporting bars. That length may likewise be varied as a control parameter variable in order to determine optimum values in dependence on type of material, thickness of material and cutting method.

Figure 5:
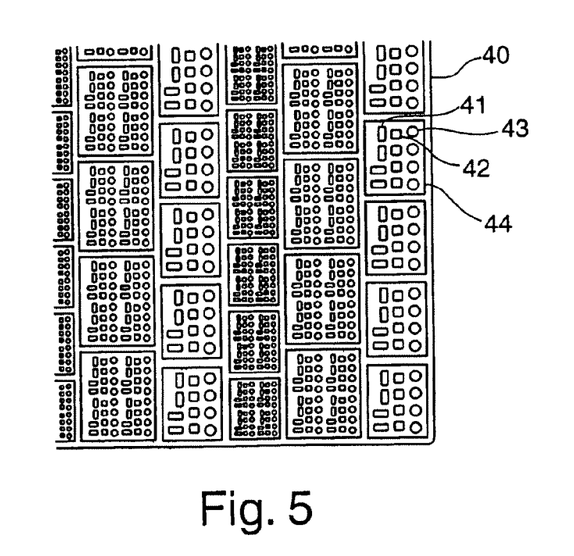
FIG. 5 is a schematic illustration of test contours for validating parameter data sets.

To validate parameter data sets, freely selectable work-piece sizes may be assigned near-production contours. The technological constraints are taken into consideration in that case by the automatic assignment to the contour variables of a range which is dependent on the selected combination of input values EW. As test contours, rectangles 41, squares 42 and circles 43 are machined, as illustrated in FIG. 5 by means of a detail of a further work-piece 40, in which the direction of approach is turned through 90° from test contour to test contour. After a specified number of test contours, for example twelve test contours, an outer contour 44 is cut so that, as in a real production operation, time and again longer contours also are executed. For high-speed applications, as an alternative or in addition, a continuous-operation validation run consisting of slot holes (see FIG. 2c) may be performed, thereby ensuring that a high cutting speed can be achieved and validated over long distances.

Using the method described above, an NC program that can be executed directly on the laser processing machine can be automatically created and configured. The method may be implemented by means of suitable software on a data-processing system, for example on an operating panel of the laser processing equipment. The result of processing is either single-piece processing to verify an individual parameter data set, processing with varying contours, control and/or processing parameters to determine suitable and/or optimum parameters, or a continuous-operation processing run with a fixed parameter data set to validate the parameters. In each case, the machine operator checks the processed workpiece in order to decide whether the parameters used are suitable for the processing operation or in order to determine the best data set in the case of parameter variation. Altogether, the method described above makes it possible for a rapid and standardized procedure to be applied in the determination and validation of parameters on various laser processing machines by providing technologically suitable cutting contours, work sequences and influencing capabilities in the machine control in an automatically retrievable form for various workpieces that are to be processed, with the result that the creation of a control program for determining parameters and for validating parameters can be performed automatically by few inputs into a user dialogue.

A number of embodiments of the invention have been described. Nevertheless, it will be understood that various modifications may be made without departing from the spirit and scope of the invention. Accordingly, other embodiments are within the scope of the following claims.

What is claimed is:

1. A method for creating a numerical control (NC) program for controlling a test run, the method comprising:
    accessing a base NC program including at least one contour variable for defining at least one test contour shape to be produced in the test run, and at least one decision function for automatically selecting the at least one contour shape;
    receiving one or more input values that are characteristic of a processing operation for parts that are actually to be produced subsequent to the test run, the one or more input values being selected by an operator through a selection function;
    creating the NC program for controlling the test run from the base NC program by processing the at least one decision function to automatically select the at least one test contour shape from a predetermined number of test contour shapes based on the input values and assigning a value to the contour variable, the value indicating the at least one contour shape that is selected by the decision function and to be produced during the test run; and
    executing the test run based on the NC program to produce at least one test contour shape for determining, optimizing and/or validating processing parameters and/or control parameters of the processing operation for parts that are actually to be produced subsequent to the test run.

2. A method according to claim 1, further comprising assigning a value to at least one of a control parameter variable and a processing parameter variable of the base NC program based on a combination of input values.

3. A method according to claim 2, further comprising providing at least one further decision function in the base NC program, and automatically executing the at least one further decision function to create the NC program by assigning values to the at least one of the control parameter variable and the processing parameter variable.

4. A method according to claim 2, wherein assigning a value to at least one of the contour variable, the processing parameter variable and the control parameter variable comprises linking the base NC program to parameter data tables and determining values of a contour parameter and the processing parameters from the parameter data tables.

5. A method according to claim 1, wherein the input values are selected from the group consisting of: type of material, thickness of material, type of gas, focal length of the focusing lens system, nozzle diameter, and type of processing.

6. A method according to claim 1, wherein the contour variables are selected from the group consisting of: type of contour, size of contour, contour spacing, contour rounding radius, length of approach path, and direction of approach.

7. A method according to claim 2, wherein the processing parameter variables are selected from the group consisting of: laser output power, focus position, processing speed, pulse frequency, processing gas pressure, laser beam diameter, and nozzle spacing.

8. A method according to claim 1, further comprising issuing at least one control command in the NC program to one of warming up and cooling down a beam-guiding optical system of a laser processing machine before production of test contours.

9. A method according to claim 2, wherein assigning a value to at least one of the processing parameter variable and the control parameter variable is carried out using a plurality of values distributed over a range which are varied during the test run, with the contour variable being assigned a fixed value.

10. A method according to claim 2, wherein assigning a value to the contour variable is carried out using a plurality of values distributed over a range which are varied during the test run, with at least one of processing parameter variables and control parameter variables being assigned a fixed value.

11. A method according to claim 1, further comprising executing an editing function for at least one of editing of the value assignment to the contour variables, to processing parameter variables and/or to control parameter variables, editing the selection of the contour variables, the processing parameter variables and the control parameter variables, a value assignment to which is carried out with a range of values, and editing parameter data tables.

12. A method according to claim 11, in which the selection function and the editing function are implemented in a single dialogue function on a user interface.

13. A non-transitory computer program product that is executable on a data-processing system and having code means adapted to carry out operations comprising:
  accessing a base numerical control (NC) program including at least one contour variable for defining at least one test contour shape to be produced in a test run, and at least one decision function for automatically selecting the at least one contour shape;
  receiving one or more input values that are characteristic of a processing operation for parts that are actually to be produced subsequent to the test run, the one or more input values being selected by an operator through a selection function;
  creating a NC program for controlling the test run from the base NC program by processing the at least one decision function to automatically select the at least one test contour shape from a predetermined number of test contour shapes based on the input values and assigning a value to the contour variable, the value indicating the at least one contour shape that is selected by the decision function and to be produced during the test run; and
  executing the test run based on the NC program to produce at least one test contour shape for determining, optimizing and/or validating processing parameters and/or control parameters of the processing operation for parts that are actually to be produced subsequent to the test run.

14. A non-transitory computer program product according to claim 13, wherein the operations further comprise assigning a value to at least one of a control parameter variable and a processing parameter variable of the base NC program based on a combination of input values.

15. A non-transitory computer program product according to claim 14, wherein the operations further comprise providing at least one further decision function in the base NC program, and automatically executing the at least one further decision function to create the NC program by assigning values to the at least one of the control parameter variable and the processing parameter variable.

16. A non-transitory computer program product according to claim 14, wherein assigning a value to at least one of the contour variable, the processing parameter variable and the control parameter variable comprises linking the base NC program to parameter data tables and determining values of the contour parameter and the processing parameters from the parameter data tables.

17. A non-transitory computer program product according to claim 13, further comprising selecting input values from the group consisting of: type of material, thickness of material, type of gas, focal length of the focusing lens system, nozzle diameter, and type of processing.

18. A non-transitory computer program product according to claim 13, further comprising selecting contour variables from the group consisting of: type of contour, size of contour, contour spacing, contour rounding radius, length of approach path, and direction of approach.

19. A non-transitory computer program product according to claim 14, further comprising selecting processing parameter variables from the group consisting of: laser output power, focus position, processing speed, pulse frequency, processing gas pressure, laser beam diameter, and nozzle spacing.

20. A non-transitory computer program product according to claim 14, wherein the operations further comprise providing an editing function for at least one of editing of the value assignment to the contour variables, to processing parameter variables and/or to control parameter variables, editing the selection of the contour variables, the processing parameter variables and the control parameter variables, a value assignment to which is carried out with a range of values, and editing parameter data tables.

* * * * *